United States Patent
Katou et al.

(10) Patent No.: US 10,434,406 B2
(45) Date of Patent: Oct. 8, 2019

(54) VIDEO GAME PROCESSING APPARATUS AND VIDEO GAME PROCESSING PROGRAM PRODUCT

(71) Applicant: SQUARE ENIX CO., LTD., Tokyo (JP)

(72) Inventors: Jun Katou, Tokyo (JP); Shingo Suzuki, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 115 days.

(21) Appl. No.: 14/773,098

(22) PCT Filed: Mar. 25, 2013

(86) PCT No.: PCT/JP2013/002018
§ 371 (c)(1),
(2) Date: Sep. 4, 2015

(87) PCT Pub. No.: WO2014/155414
PCT Pub. Date: Oct. 2, 2014

(65) Prior Publication Data
US 2016/0038831 A1    Feb. 11, 2016

(51) Int. Cl.
*A63F 13/23* (2014.01)
*A63F 13/00* (2014.01)
(Continued)

(52) U.S. Cl.
CPC .............. *A63F 13/23* (2014.09); *A63F 13/00* (2013.01); *A63F 13/2145* (2014.09); *A63F 13/42* (2014.09); *A63F 2300/305* (2013.01)

(58) Field of Classification Search
CPC ...... A63F 13/23; A63F 13/2145; A63F 13/42; A63F 13/00; A63F 2300/305
See application file for complete search history.

(56) References Cited

U.S. PATENT DOCUMENTS

2006/0073863 A1* 4/2006 Hagiwara ............... A63F 13/10
463/9
2007/0060347 A1* 3/2007 Itou ........................ A63F 13/10
463/31
(Continued)

FOREIGN PATENT DOCUMENTS

JP    2000-167247    6/2000
JP    2006-130303    5/2006
(Continued)

OTHER PUBLICATIONS

JP2011-156159_MachineTranslation.pdf, machine translation of JP2011156159 (A).*
JP2011-156159 MachineTranslation.pdf, machine translation of JP2011156159 (A). (Year: 2011).*
International Search Report (ISR) from International Searching Authority (Japan Patent Office) in International Pat. Appl. No. PCT/JP2013/002018, dated Apr. 16, 2013.
(Continued)

*Primary Examiner* — William H Mcculloch, Jr.
*Assistant Examiner* — Yingchuan Zhang
(74) *Attorney, Agent, or Firm* — Greenblum & Bernstein, P.L.C.

(57) ABSTRACT

A video game processing apparatus selectably displays a plurality of panels within a predetermined area on a display screen with a predetermined array (for example, Step S101); receives, from a user, a selecting operation against any of the plurality of displayed panels (for example, Step S201); specifies continuously selectable panels in accordance with the panel for which the selecting operation is received from the user (for example, Step S202); and changes a display mode of each of the specified panels so as to become the display mode other than a display mode of each of the other panels (for example, Step S204).

12 Claims, 8 Drawing Sheets

(51) Int. Cl.
*A63F 13/42* (2014.01)
*A63F 13/2145* (2014.01)

(56) References Cited

U.S. PATENT DOCUMENTS

| | | | | |
|---|---|---|---|---|
| 2008/0045303 | A1* | 2/2008 | Dunaevsky | G07F 17/3211 463/20 |
| 2011/0177858 | A1 | 7/2011 | Mogami et al. | |
| 2012/0190459 | A1* | 7/2012 | Kobayashi | A63F 13/493 463/43 |
| 2013/0290884 | A1* | 10/2013 | Sotoike | A63F 13/06 715/765 |
| 2013/0337901 | A1* | 12/2013 | Saruta | A63F 13/10 463/25 |

FOREIGN PATENT DOCUMENTS

| | | |
|---|---|---|
| JP | 2006-218321 | 8/2006 |
| JP | 2006-318392 | 11/2006 |
| JP | 2007-075209 | 3/2007 |
| JP | 2007-075447 | 3/2007 |
| JP | 2008-245985 | 10/2008 |
| JP | 2009-247474 | 10/2009 |
| JP | 2009-297251 | 12/2009 |
| JP | 2011-062419 | 3/2011 |
| JP | 2011-062470 | 3/2011 |
| JP | 2011-156159 | 8/2011 |
| JP | 2011-206445 | 10/2011 |

OTHER PUBLICATIONS

"Choryuha! DRAGON LINE", Gekkan Apuri Style, vol. 1, No. 3, p. 058 (Feb. 28, 2013).
Wonder Life Special Nintendo Koshiki Guide Book Fire Emblem Akatsuki no Megami, 1st edition, Shogakukan, p. 6, refer to the description 'Ido Kano na Han'i ga Ao de Hyoji sareru' in the column with the title of 'Unit o Ido saseru niwa' (Apr. 17, 2007).
'Android Apuri Review' Dai 17 Kai: Panel ga Michi nimo Buki nimo naru? 'Road to Dragon' de, Iza Boken no Sekai e, [online], 4Game.net (Mar. 7, 2013), retreived at Internet <URL:http://www.4gamer.net/games/202/G020257/20130305070/>, retreived on Apr. 4, 2013.
Office Action from Japan Patent Office (JPO) in Japanese Patent Appl. No. 2015-507674, dated Apr. 11, 2017, together with a partial English language translation.
Office Action from Japan Patent Office (JPO) in Japanese Patent Appl. No. 2015-507674, dated Dec. 5, 2017, together with an English language translation.
Office Action from Japan Patent Office (JPO) in Japanese Patent Appl. No. 2018-099927, dated May 21, 2019.
"Chouryuuha! Dragon Line", Monthly Apuri Style, vol. 1, Issue 3, East Press Co., Ltd., p. 58 (Feb. 28, 2013).
Office Action from Japan Patent Office (JPO) in Japanese Patent Appl. No. 2018-099927, dated May 21, 2019, together with an English language translation.

* cited by examiner

Fig. 2

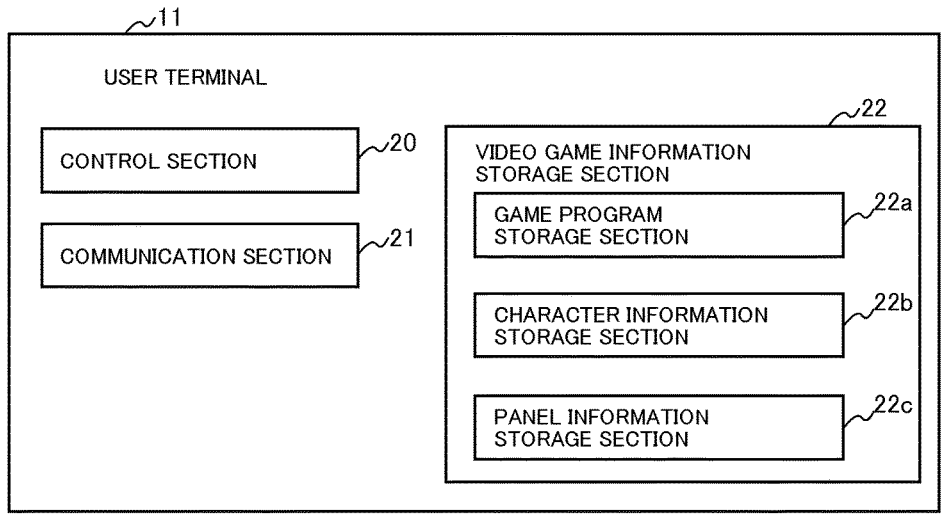

Fig. 3

CHARACTER INFORMATION

| CHARACTER TYPE | CHARACTER ID | CHARACTER NAME | APPEARANCE MODE | JOB | STATUS | ... |
|---|---|---|---|---|---|---|
| PLAYER CHARACTER | 1 | A | TYPE 1 | FIGHTER | ... | ... |
| PLAYER CHARACTER | 2 | B | TYPE 2 | SOLDIER | ... | ... |
| PLAYER CHARACTER | 3 | C | TYPE 3 | WIZARD | ... | ... |
| PLAYER CHARACTER | 4 | D | TYPE 4 | PRIEST | ... | ... |
| ⋮ | ⋮ | ⋮ | ⋮ | ⋮ | ⋮ | ⋮ |
| ENEMY CHARACTER | 78 | X | TYPE N | – | ... | ... |
| ⋮ | ⋮ | ⋮ | ⋮ | ⋮ | ⋮ | ⋮ |

Fig. 4

PANEL INFORMATION

| PATTERN (ATTRIBUTE) | JOB | ACTION |
|---|---|---|
| FIST | FIGHTER | ATTACK SINGLE ENEMY WITH FIST |
| SWORD | SOLDIER | ATTACK SINGLE ENEMY WITH SWORD |
| STICK | WIZARD | ATTACK SINGLE ENEMY WITH MAGIC |
| CLOTH | PRIEST | ATTACK SINGLE ENEMY WITH MAGIC |

VIDEO GAME PROCESSING APPARATUS AND VIDEO GAME PROCESSING PROGRAM PRODUCT

CROSS REFERENCE TO RELATED APPLICATIONS

The present application is a U.S. national phase application under 35 U.S.C. § 371 of PCT Application No. PCT/JP2013/002018, filed on Mar. 25, 2013.

FIELD OF THE INVENTION

The present invention relates to a technique to control progress of a video game by displaying an object on a display screen of a display device.

BACKGROUND OF THE INVENTION

Heretofore, there is video games in each of which progress of the video game is controlled by displaying an object on a display screen of a display device. In such video games, there is one in which a user is caused to select an object (for example, Patent Literature 1).

PRIOR ART DOCUMENTS

Patent Literature

[Patent Literature 1]
Japanese Patent Application Publication No. 2007-75209

SUMMARY OF THE INVENTION

Problems to be Solved by the Invention

However, there is a case where, when to continuously select a displayed object in a video game in which a large number of objects are displayed, it is difficult to grasp an object or objects that can be selected next time. Namely, there is a case that the large number of objects causes operability to be lowered. Therefore, it was expected a video game processing apparatus in which it is easy for a user to operate and objects are display in a display mode by which erroneous operations of the user becomes less even in a case where the large number of objects are displayed.

It is an object of the present invention to display an object with a display mode in which it is easy for a user to operate and erroneous operations of the user becomes less.

Means for Solving the Problems

A video game processing apparatus according to the present invention is a video game processing apparatus for controlling progress of a video game by causing a display device to display an object, the video game processing system including: a panel display section configured to selectably display a plurality of panels within a predetermined area on a display screen with a predetermined array; a selecting operation receiving section configured to receive, from a user, a selecting operation against any of the plurality of panels displayed by the panel display section; a continuously selecting panel specifying section configured to specify continuously selectable panels in accordance with the panel indicated by the selecting operation received by the selecting operation receiving section; and a display mode changing section configured to change a display mode of each of the continuously selectable panels specified by the continuously selecting panel specifying section so as to become the display mode other than a display mode of each of the other panels.

By configuring the video game processing apparatus as described above, it becomes possible to display an object with a display mode in which it is easy for a user to operate and erroneous operations of the user becomes less.

The video game processing apparatus may be configured so that the continuously selecting panel specifying section specifies a panel neighboring the panel selected by the selecting operation receiving section from the user as the continuously selectable panel.

The video game processing apparatus may be configured so as to include a panel information storage section configured to store panel information, the panel information containing attribute information that indicates an attribute of a panel, and so that the continuously selecting panel specifying section specifies the continuously selectable panels on the basis of an attribute of the panel selected by the selecting operation receiving section from the user and a predetermined rule.

The video game processing apparatus may be configured so that the display mode changing section changes a size of each of the continuously selectable panels specified by the continuously selecting panel specifying section so as to become larger compared with a size of the other panel.

The video game processing apparatus may be configured so that the display mode changing section changes a display mode of each of panels other than the continuously selectable panels specified by the continuously selecting panel specifying section.

The video game processing apparatus may be configured so that the display device has a touch panel function, and the selecting operation receiving section receives a drag operation from the user.

Moreover, a video game processing program product according to the present invention is a video game processing program product configured to achieve a function to control a video game processing apparatus, the video game processing apparatus controlling progress of a video game by displaying an object on a display screen of a display device, the video game processing program product causing the video game processing apparatus to execute: a panel displaying function configured to selectably display a plurality of panels within a predetermined area on the display screen with a predetermined array; a selecting operation receiving function configured to receive, from a user, a selecting operation against any of the plurality of panels displayed by the panel display function; a continuously selecting panel specifying function configured to specify continuously selectable panels in accordance with the panel indicated by the selecting operation received by the selecting operation receiving function; and a display mode changing function configured to change a display mode of the continuously selectable panels specified by the continuously selecting panel specifying function so as to become the display mode other than a display mode of the other panels.

Effects of the Invention

According to the present invention, it becomes possible to display an object with a display mode in which it is easy for a user to operate and erroneous operations of the user becomes less.

BRIEF DESCRIPTION OF THE DRAWINGS

FIG. 2 is an explanatory drawing showing an example of configurations of a control section and a storage section of a user terminal.

FIG. 3 is an explanatory drawing showing an example of a storage state of character information.

FIG. 4 is an explanatory drawing showing an example of a storage state of panel information.

DESCRIPTION OF EMBODIMENT

Hereinafter, an example of one embodiment according to the present invention will be described with reference to the drawings.

Figure 1:
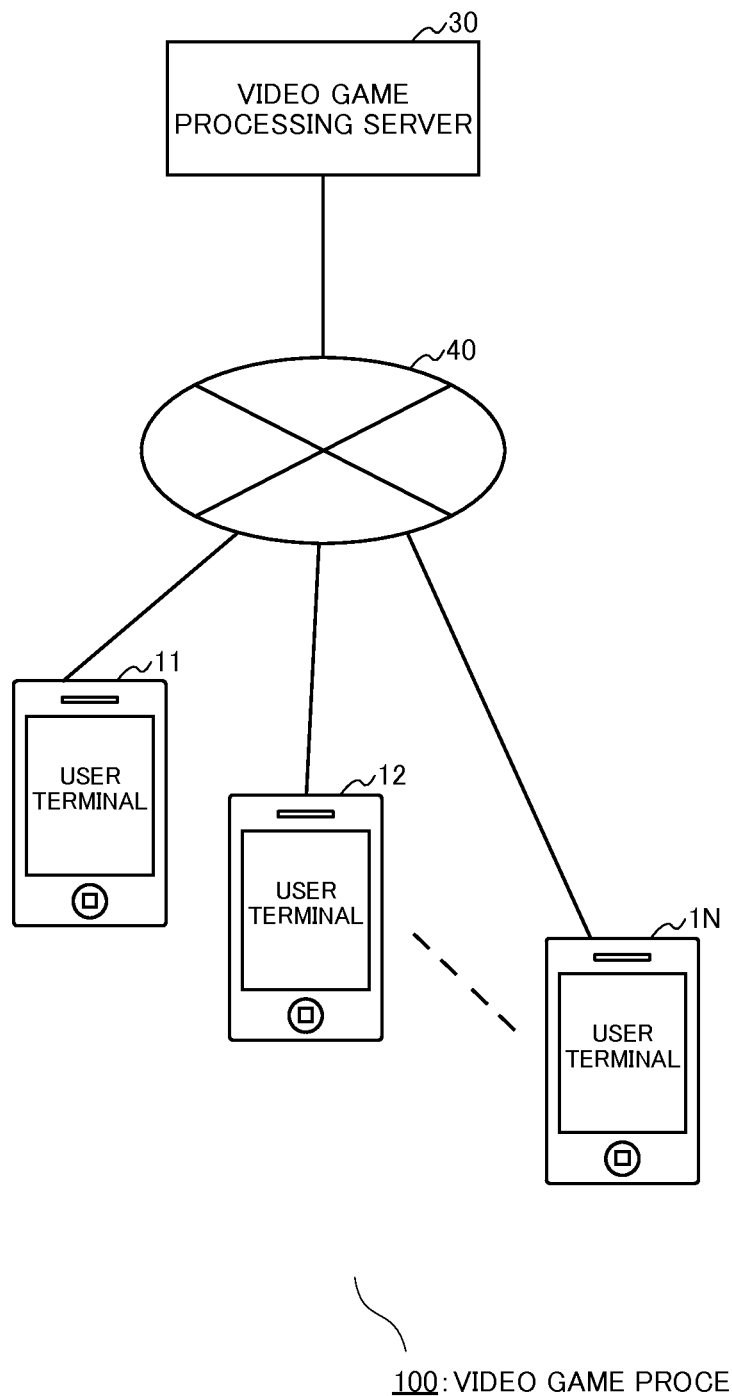
FIG. 1 is a block diagram showing a configuration example of a video game processing system.

FIG. 1 is a block diagram showing a configuration example of a video game processing system 100 according to one embodiment of the present invention. As shown in FIG. 1, the video game processing system 100 includes: user terminals 11 to 1N ("N" is an arbitrary integer) used by each of a plurality of users (players); and a video game processing server 30. In this regard, a configuration of the video game processing system 100 is not limited to this configuration. The video game processing system 100 may be configured so that a plurality of users uses a single user terminal, or a plurality of servers are provided.

Each of the plurality of user terminals 11 to 1N is managed by a user (player) who plays a video game, and is configured by a mobile communication terminal, such as a cellular phone terminal, a PDA (Personal Digital Assistants), and a mobile game apparatus, by which the user can play a network delivery-type game, for example. Each of the plurality of user terminals 11 to 1N includes hardware (for example, a display device for displaying a game screen, an audio output device and the like) and software to carry out the video game by connecting the plurality of user terminals 11 to 1N to a communication network 40 and carrying out communication with the video game processing server 30. In this regard, the plurality of user terminals 11 to 1N may be configured so that the plurality of user terminals 11 to 1N can directly communicate with each other without passing through the video game processing server 30.

Further, the display device of each of the plurality of user terminals 11 to 1N has a touch panel function by laminating a touch panel portion on a surface of a display section, such as an LCD. In this regard, various kinds of structures, such as an optical type, a resistive film type, a pressure sensitive type and the like, can be adopted as the touch panel portion. In this regard, each of the user terminals 11 to 1N according to the present embodiment is configured so as to have the touch panel function. However, each of the user terminals 11 to 1N may be configured so as not to have the touch panel function.

FIG. 2 is a block diagram showing an example of configuration of the user terminal 11. The user terminal 11 includes a control section 20, a communication section 21, and a video game information storage section 22. In this regard, in the present embodiment, the user terminal 11 will be described as an example. However, the other user terminals 12 to 1N have the similar configuration to the configuration with which the user terminal 11 is provided.

The control section 20 includes a CPU, a ROM and the like, and has a function to carry out a control of the whole user terminal 11 in accordance with control programs stored in the video game information storage section 22.

The communication section 21 has a function to communicate among the plurality of user terminals 11 to 1N via the communication network 40 such as the Internet or the like.

The video game information storage section 22 is configured by a database apparatus, for example. The video game information storage section 22 is a storage medium in which various kinds of information related to the video game whose progress is controlled by the video game processing system 100 and various kinds of data such as a control program for the video game are stored. However, the video game processing system 100 may be configured so that part of the information related to the video game is managed by each of the plurality of user terminals 11 to 1N.

The video game information storage section 22 includes: a game program storage section 22a; a character information storage section 22b; and a panel information storage section 22c (see FIG. 2).

The character information storage section 22b is a storage medium for storing character information regarding various kinds of characters for carrying out battle processing. FIG. 3 is an explanatory drawing showing an example of a storage state of the character information. As shown in FIG. 3, the character information contains: a character type indicating either a player character or an enemy character; a character ID for uniquely specifying a character; a character name; an appearance mode of the character; a job of the character; and a status of the character.

Here, the "job" is attribute information indicating an attribute of the player character. In the present embodiment, the player characters are classified into any of jobs including a fighter, a soldier, a wizard, a priest and the like. In this regard, the video game processing system 100 may be configured so that the job is set to only the player character, or so that the job is set to characters including the player character and the enemy character.

The panel information storage section 22c is a storage medium for storing panel information regarding display objects that the user is caused to select for carrying out the battle processing. FIG. 4 is an explanatory drawing showing an example of a storage state of the panel information. As shown in FIG. 4, the panel information contains a pattern, a job, and an action.

Here, the "pattern" is information indicating a display mode of a panel. The pattern according to the present embodiment is stored as a "fist", a "sword", a "stick", or a "cloth". In this regard, the pattern according to the present embodiment corresponds to the job indicating an attribute.

Here, action content is information indicating the content of an action that the player character is caused to carry out in the battle processing. The action content according to the present embodiment is stored as "attack a single enemy with a fist", "attack a single enemy with a sword", or "attack a single enemy with magic". In this regard, the video game processing system 100 may be configured so that the action content is associated with the number of panels selected by the user in the battle processing, and so that: the control section 20 specifies the number of panels selected by the user; and refers to the panel information to determine the action content corresponding to the number of panels as the action content of the character.

Each of the video game processing server 30 and the plurality of user terminals 11 to 1N is connected to the communication network 40 such as the Internet. In this regard, although it is not shown in the drawings, the plurality of user terminals 11 to 1N is connected to the communication network 40 by carrying out data communication with a base station managed by a communication carrier by means of a wireless communication line.

The video game processing system 100 has various kinds of functions to control progress of a video game that each of a plurality of players plays in a virtual space or a virtual area (for example, so-called online game and a social game (i.e., a game provided in an SNS (Social Networking Service))).

The video game processing server 30 is managed by an administrator of the video game processing system 100, and has various kinds of functions to provide (or deliver) information on the video game to the user terminals 11 to 1N.

The video game processing server 30 is configured by an information processing apparatus such as a WWW server, and includes a storage medium for storing various kinds of information.

Next, an operation of the video game processing system 100 according to the present embodiment will be described. In this regard, the content of operations and/or processings with no relationship to the present invention may be omitted.

Figure 5:
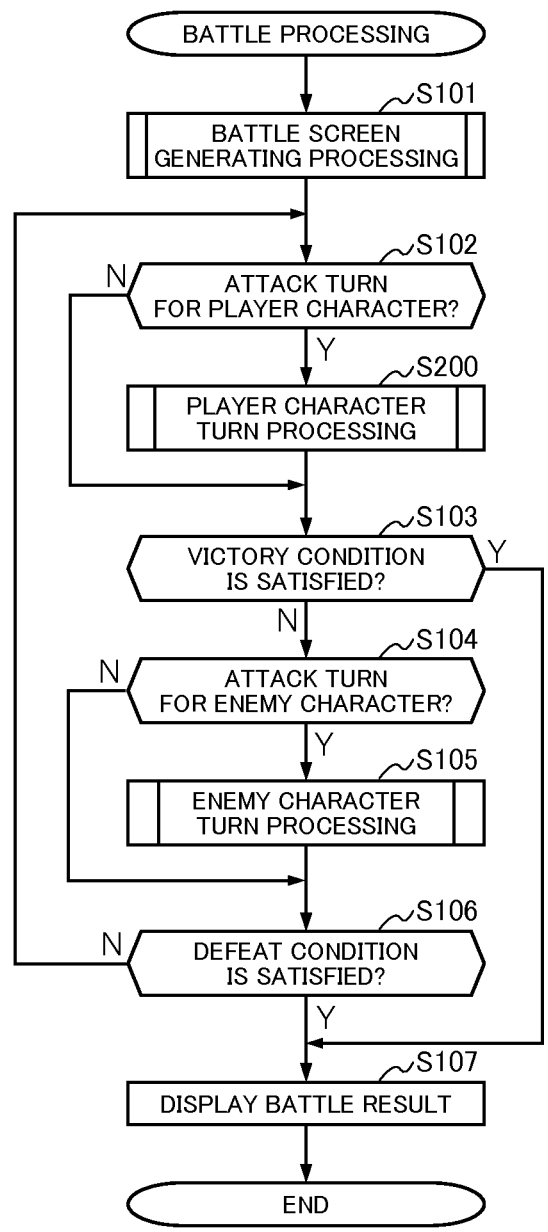
FIG. 5 is a flowchart showing an example of battle processing.

FIG. 5 is a flowchart showing an example of the battle processing carried out by the user terminal 11 in the video game processing system 100. In the present embodiment, when the control section 20 of the user terminal 11 receives a battle start operation from the user during progress of the video game, the battle processing is started. In this regard, the video game processing system 100 according to the present embodiment carries out a turn-based battle system. When a turn for the player character is started, the video game processing system 100 causes the user to play a puzzle game, and carries out attack processing for the player character in accordance with a result of the played puzzle game. In this regard, the video game processing server 30 may be configured so as to carry out part of the processing shown in FIG. 5, or the user terminals 12 to 1N may be configured so as to carry out part of the processing shown in FIG. 5.

Figure 6:
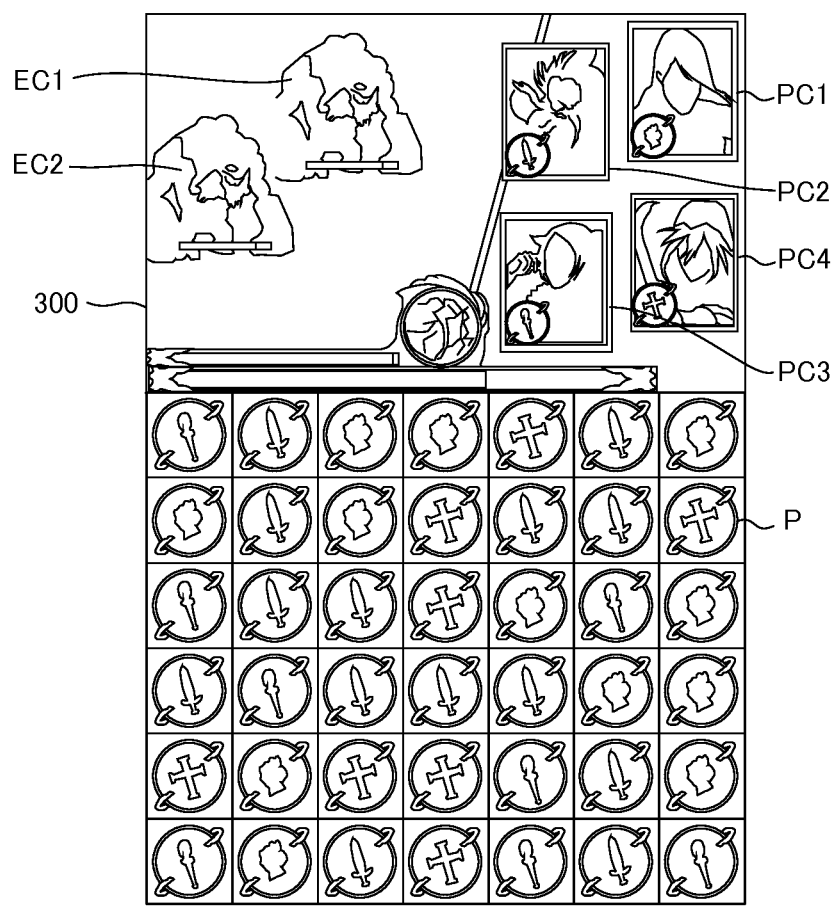
FIG. 6 is a screen diagram showing an example of a battle screen.

In the battle processing, the control section 20 first carries out battle screen generating processing (Step S101). Namely, the control section 20 generates a battle screen, and causes the display device of the user terminal 11 to display the generated battle screen. FIG. 6 is a screen diagram showing an example of the battle screen. As shown in FIG. 6, a battle screen 300 includes a plurality of objects. Namely, the battle screen 300 includes player characters PC1 to PC4, enemy characters EC1 to EC2, and a plurality of panels P. The player characters PC1 to PC4 according to the present embodiment are displayed as cards. Further, the battle screen 300 includes a character arrangement region in which each of the characters is arranged, and a panel arrangement region in which each of the panels is arranged. Each of the panels arranged in the panel arrangement region is selectably arranged in a predetermined array. Namely, the user terminal 11 causes the display device to selectably display the plurality of panels within a predetermined area of the display screen in a predetermined array. In the panel arrangement region according to the present embodiment, total 42 panels constituted by 7 columns×6 panels are arranged.

When the battle screen generating processing is carried out, the control section 20 determines whether it is an attack turn for the player character or not (Step S102). In a case where it is determined that it is not an attack turn for the player character ("No" at Step S102), the control section 20 determines whether a victory condition is satisfied or not (Step S103).

On the other hand, in a case where it is determined that it is an attack turn for the player character ("Yes" at Step S102), the control section 20 carries out the player character turn processing (Step S200).

Figure 7:
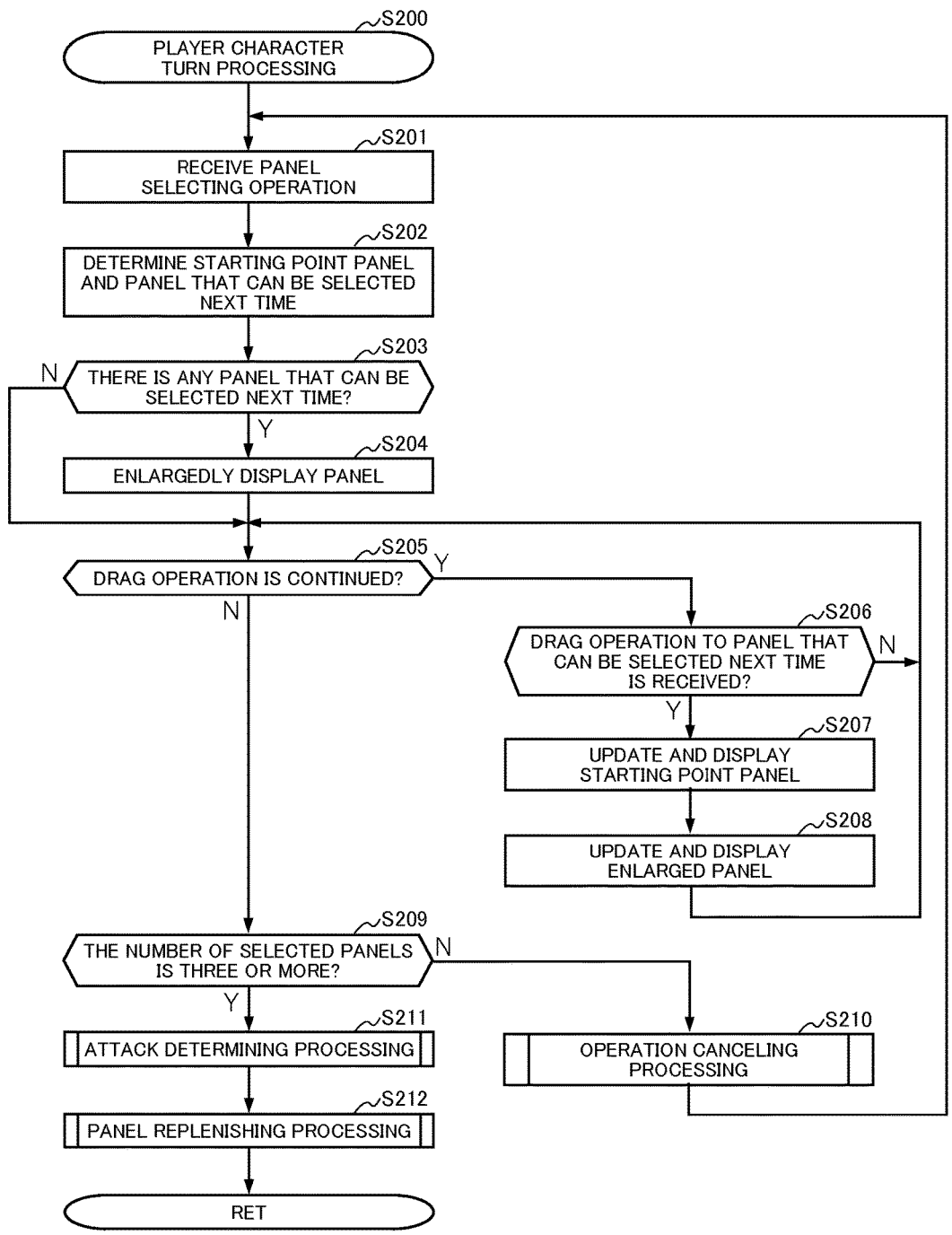
FIG. 7 is a flowchart showing an example of player turn processing.
Figure 8:
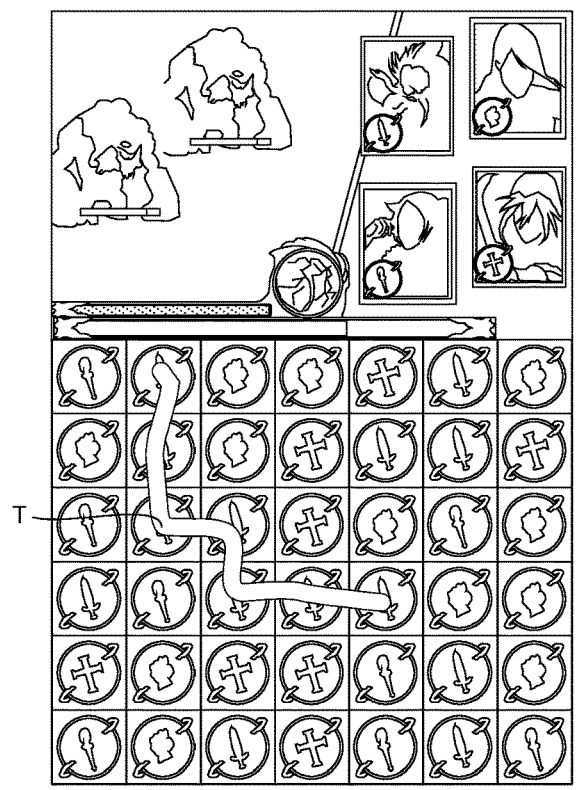
FIG. 8 is a screen diagram showing an example of the battle screen on which an operation track by a user is displayed.

FIG. 7 is a flowchart showing an example of the player turn processing. In this regard, in processes carried out in the player character turn processing according to the present embodiment, the control section 20 causes the display device to superimposedly display on the battle screen a track of the drag operation to the inside of the panel arrangement region received from the user. FIG. 8 is a screen diagram showing an example of the battle screen on which an operation track by the user is displayed. As shown in FIG. 8, a track T of the drag operation to the inside of the panel arrangement region received from the user is displayed so as to be superimposed on the battle screen.

In an example of the player character turn processing, the control section 20 first receives a selecting operation for any of the plurality of displayed panels from the user (Step S201). Namely, the control section 20 receives, from the user, a touch operation to the panel arranged in the panel arrangement region on the touch panel. In this regard, in the present embodiment, the video game processing apparatus is configured so as to receive a drag operation based on a touch operation to the touch panel from the user. However, the video game processing apparatus may be configured so as to receive a drag operation by means of a mouse.

When an operation to select a panel is received from the user, the control section 20 specifies the selected panel as a starting point panel, and specifies continuously selectable panels (that is, panels that can be selected next time) in accordance with the starting point panel (Step S202). Namely, the control section 20 specifies the continuously selectable panels in accordance with the panel indicated by the selecting operation of the user.

In the present embodiment, the control section 20 refers to the panel information storage section 22c in which the panel information containing the attribute information that indicates an attribute of a panel is stored, and specifies the continuously selectable panel on the basis of the attribute of the panel selected by the selecting operation receiving section from the user and the predetermined rule. The control section 20 according to the present embodiment is configured so as to specify a panel or panels whose attribute is the same as the attribute of the panel selected by the user and that neighbor(s) the panel selected by the user as continuously selectable panels. Namely, in the present embodiment, the control section 20 stores a rule "the same attribute as the attribute of the panel selected by the user and the panel neighboring the selected panel" as a predetermined rule. In this regard, the control section 20 may specify a panel whose attribute is the same as the attribute of the panel selected by the user as the continuously selectable panels. Further, the control section 20 may specify a panel or panels whose attribute is different from the attribute of the panel selected by the user as the continuously selectable panels.

Further, the control section 20 may specify a panel or panels neighboring the panel selected by the user as the continuously selectable panels.

Figure 9:
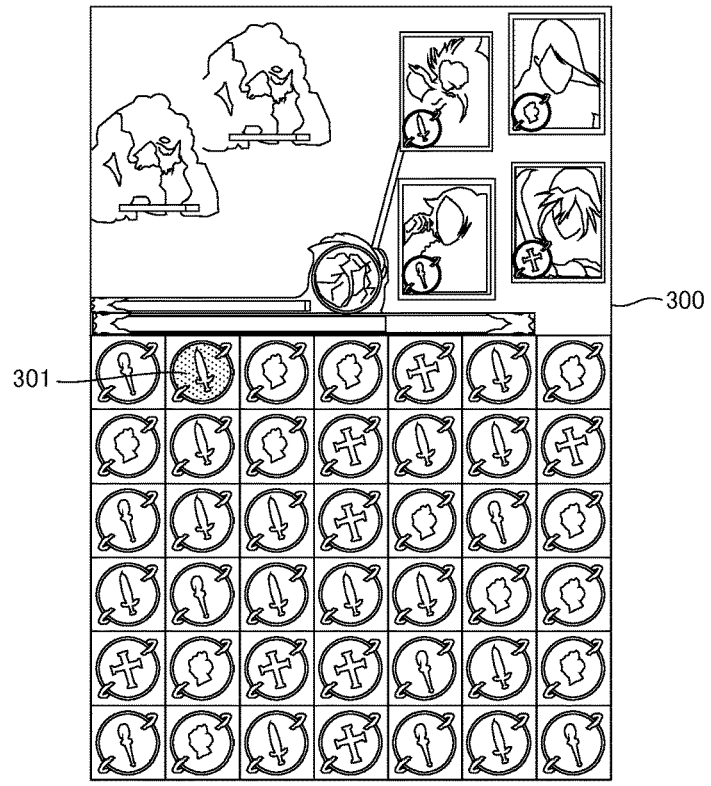
FIG. 9 is a screen diagram showing an example of the battle screen on which a starting point panel is displayed.

FIG. 9 is a screen diagram showing an example of the battle screen on which the starting point panel is displayed. As shown in FIG. 9, a starting point panel 301 is determined from the plurality of panels displayed on the battle screen 300 by a selecting operation of the user. In this regard, the user terminal 11 according to the present embodiment is configured so as to carry out processing to change the display modes in order to distinguish between the starting point panel and the other panels. However, the user terminal 11 may be configured so as not to carry out the processing to change the display modes.

When the starting point panel is determined and the panel that can be selected next time is determined, the control section 20 determines whether a panel that can be selected next time exists or not (Step S203). In a case where it is determined that no panel that can be selected next time exists, the control section 20 determines whether the drag operation as the selecting operation for the panel received from the user is continued or not (Step S205).

On the other hand, in a case where it is determined that there is no panel that can be selected next time, the control section 20 largely displays (or enlarges and displays) the panel that can be selected next time compared with the other panels (Step S204).

Figure 10:
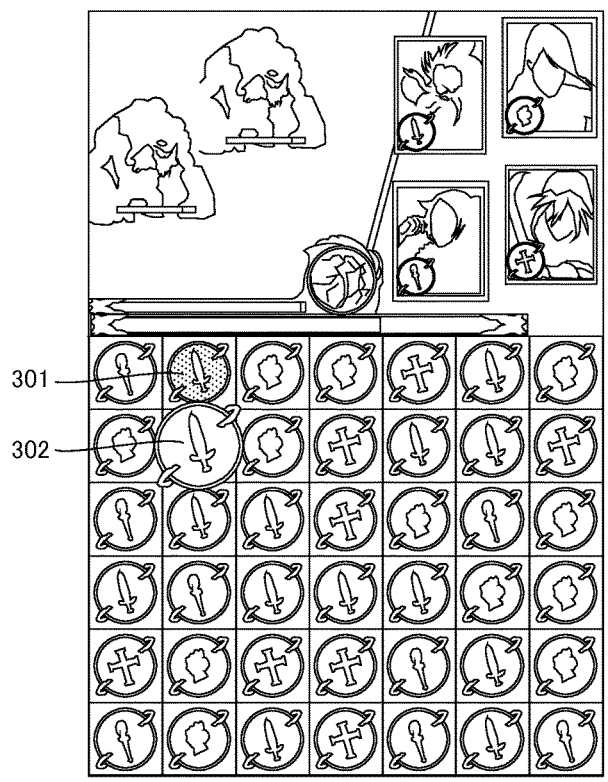
FIG. 10 is a screen diagram showing an example of the battle screen on which an enlarged panel is displayed.

FIG. 10 is a screen diagram showing an example of the battle screen on which an enlarged panel is displayed. As shown in FIG. 10, a panel 302 that neighbors the starting point panel 301 whose "pattern" is a "sword" and has the same attribute (that is, has a "pattern" of a "sword") is enlarged and displayed.

When the panel is enlarged and displayed, the control section 20 determines whether the drag operation as the selecting operation for the panel received from the user is continued or not (Step S205).

In a case where it is determined that the drag operation as the selecting operation for the panel received from the user is continued ("Yes" at Step S205), the control section 20 determines whether a drag operation for the panel that can be selected next time is received or not (Step S206).

In a case where it is determined that the drag operation for the panel that can be selected next time is not received ("No" at Step S206), the control section 20 causes the processing flow to proceed to Step S205, and determines whether the drag operation as the selecting operation for the panel received from the user is continued or not.

On the other hand, in a case where it is determined that a drag operation for the panel that can be selected next time is received ("Yes" at Step S206), the control section 20 updates the starting point panel and causes the display device to display the starting point panel (Step S207). Namely, the control section 20 updates a panel that becomes a target of the drag operation (that is, the panel selected by the user) as a next starting point panel and causes the display device to display the panel.

When the starting point panel is updated and displayed, the control section 20 updates the starting point panel and causes the display device to display the starting point panel (Step S208). Namely, the control section 20 refers to the panel information, and causes the display device to enlargedly display the panel corresponding to the starting point panel thus updated and displayed.

Figure 11:
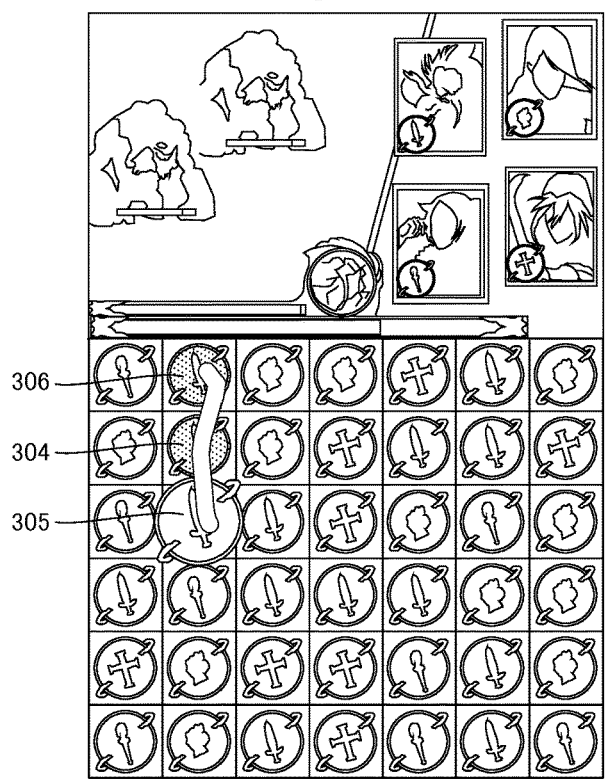
FIG. 11 is a screen diagram showing an example of the battle screen on which an updated enlarged panel is displayed.

FIG. 11 is a screen diagram showing an example of the battle screen on which the updated enlarged panel is displayed. As shown in FIG. 11, a panel 305 that has an attribute corresponding to the updated starting point panel 304 (that is, has a "pattern" of a "sword") and neighbors the updated starting point panel 304 is enlarged and displayed. Further, a panel 306 that has already been selected from the user is excluded from panels each of which becomes a target to be enlarged and displayed. For this reason, even though the panel 306 is a panel that has an attribute corresponding to the starting point panel 304 and neighbors the starting point panel 304, the panel is not to be enlarged and displayed.

When the enlarged panel is updated and displayed, the control section 20 causes the processing flow to shift to Step S205, and determines whether the drag operation as the selecting operation for the panel, which is received from the user, is continued or not (Step S205).

Subsequently, in a case where it is determined that the drag operation is not continued ("No" at Step S205), the control section 20 determines whether or not the number of selected panels becomes three or more (Step S209). In this regard, the video game processing system 100 according to the present embodiment is configured so as to shift to attack determining processing in a case where the number of the selected panels is three or more. However, it is not limited to three or more. For example, the video game processing apparatus may be configured so as to shift to the attack determining processing in a case where the number of the selected panels is three or less. Alternatively, the video game processing apparatus may be configured so as to shift to the attack determining processing in a case where the number of the selected panels becomes three.

In a case where it is determined that the number of selected panels does not become three or more ("No" at Step S209), the control section 20 carries out operation canceling processing (Step S210). Namely, the control section 20 cancels the processes that have already carried out in the player character turn processing, and causes the display device to display the battle screen when the player character turn processing was started.

On the other hand, in a case where it is determined that the number of selected panels becomes three or more ("Yes" at Step S210), the control section 20 carries out the attack determining processing (Step S211). In the attack determining processing according to the present embodiment, the control section 20 deletes the panel selected by the user; refers to the character information to calculate an attack character and a damage amount according to the number of selected panels; carries out an attack rendering against the enemy character on the basis of the calculated attack character and the damage amount; and refers to the character information to carry out processing to subtract an HP of the character.

When the attack determining processing is carried out, the control section 20 carries out panel replenishing processing (Step S212). In the panel replenishing processing according to the present embodiment, the control section 20 carries out a panel replenishing lottery for replenishing the deleted panel; determines a panel to be replenished by means of the replenish lottery; and arranges the determined panel on a column of the deleted panel. Further, the control section 20 causes the display device to display, when to arrange the panel, the panel so as to appear from an upper frame of the panel arrangement region; and carries out a falling display rendering in which the panel is falling-displayed so as to neighbor the panels that remains (or arranged) in the column to which the displayed panel is replenished. When the panels are replenished by the number of deleted panels, the control section 20 terminates the panel replenishing processing.

When the panel replenishing processing is carried out, the control section 20 terminates the player character turn processing, and causes the processing flow to shift to the battle processing.

When the panel is replenished and the player character turn processing is terminated, the control section 20 determines whether the victory condition is satisfied or not (Step S103).

In a case where it is determined that the victory condition is satisfied ("Yes" at Step S103), the control section 20 causes the display device to display a battle result (Step S107).

On the other hand, in a case where it is determined that the victory condition is not satisfied ("No" at Step S103), the control section 20 determines whether it is an attack turn for the enemy character or not (Step S104).

In a case where it is determined that it is not the attack turn for the enemy character ("No" at Step S104), the control section 20 determines whether a defeat condition is satisfied or not (Step S106).

On the other hand, in a case where it is determined that it is the attack turn for the enemy character ("Yes" at Step S104), the control section 20 carries out enemy character turn processing (Step S105). In the enemy character turn processing according to the present embodiment, the control section 20 specified an enemy character against which the player character carries out an attack; refers to the character information to calculate an attack target and a damage amount; carries out an attack rendering against the player character on the basis of the calculated attack target and the damage amount; and refers to the character information to carry out processing to subtract an HP of the player character.

When the enemy character turn processing is carried out, the control section 20 determines whether the defeat condition is satisfied or not (Step S106).

In a case where it is determined that the defeat condition is not satisfied ("No" at Step S106), the control section 20 causes the processing flow to shift to Step S102, and determines whether it is an attack turn for the player character.

On the other hand, in a case where it is determined that the defeat condition is satisfied ("Yes" at Step S106), the control section 20 causes the display device to display a battle result (Step S107). When the battle result is displayed, the control section 20 terminates the battle processing.

As explained above, in the embodiment described above, the video game processing apparatus (the user terminals 11 to 1N or the video game processing server 30) for controlling the progress of the video game by displaying an object on the display screen of the display device is configured so as to: selectably display the plurality of panels within a predetermined area on the display screen with a predetermined array (for example, Step S101); receive, from the user, the selecting operation against any of the plurality of panels thus displayed (for example, Step S201); specify the continuously selectable panels in accordance with the panel indicated by the selecting operation (for example, Step S202); and change a display mode of the continuously selectable panel thus specified so as to become the display mode other than a display mode of each of the other panels (for example, Step S204). Therefore, it becomes possible to display an object with a display mode in which it is easy for the user to operate and erroneous operations of the user becomes less.

In particular, in the embodiment described above, the video game processing apparatus is configured so as to: specify the continuously selectable panel in accordance with the panel selected by the user; and change a display mode of the specified panel so that a display mode of the specified panel becomes different from a display mode of each of the other panels. Therefore, it becomes possible to display an object with a display mode in which it is easy for the user to watch the object, and it becomes possible to provide the video game processing apparatus that causes the user to carry out progress of the video game by means of intuitive operations.

Further, in the embodiment described above, the video game processing apparatus is configured so as to specify panels neighboring the panel selected by the user as the continuously selectable panel. According to such a configuration of the video game processing apparatus, it becomes easy to continuously select the panel displayed on the display device. Therefore, it becomes possible to provide the video game processing apparatus in which it is easy for the user to operate, and it becomes possible to provide the video game processing apparatus that causes the user to carry out progress of the video game by means of intuitive operations.

Further, in the embodiment described above, the video game processing apparatus is configured so that a size of the continuously selectable panel thus specified becomes larger compared with that of each of the other panels. According to such a configuration, it becomes possible to easily grasp which panel the user can select next time. Therefore, it becomes possible to display an object with a display mode in which erroneous operations of the user becomes less.

Further, although it has not been mentioned particularly in the embodiment described above, the video game processing apparatus may be configured so as to change a display mode of each of panels other than the specified continuously selectable panel. According to such a configuration of the video game processing apparatus, it becomes possible to provide a video game processing apparatus that allows the video game to carry out progress of the video game by means of intuitive operations by emphasizing panels that can be selected continuously.

Further, although it has not been mentioned particularly in the embodiment described above, the video game processing apparatus may be configured so as to display the panel other than the continuously selectable panel thus specified in a dark change display mode. According to such a configuration of the video game processing apparatus, it becomes possible to provide a video game processing apparatus that allows the video game to carry out progress of the video game by means of intuitive operations by emphasizing panels that can be selected continuously.

Further, in the embodiment described above, the video game processing apparatus is configured so that the display device has a touch panel function and a drag operation is received from the user. According to such a configuration of the video game processing apparatus, it becomes possible to provide a video game processing apparatus that allows the video game to further carry out progress of the video game by means of intuitive operations.

Figure 12:
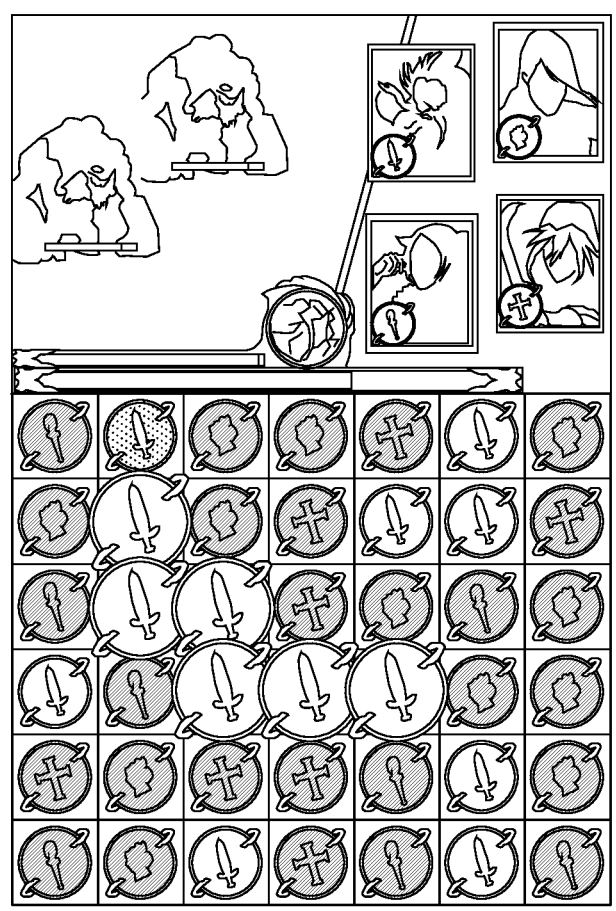
FIG. 12 is a screen diagram showing an example of the battle screen on which a display mode of the panel is changed.

In this regard, although it has not been mentioned in the embodiment described above, the video game processing apparatus may be configured so as to: change a display mode of each of all panels that can be selected continuously; and display all the panels in a case where a first selecting operation to the plurality of displayed panels is received from the user. FIG. 12 is a screen diagram showing an example of the battle screen on which a display mode of each of all panels that can be selectable continuously is changed. Namely, the video game processing apparatus may be configured so as to: specify all panels that can be selected continuously by predicting panels that can be selected next time when the panel that can be selected next time is set as a starting point panel; and change a display mode of the specified panel so that the display mode of the panel is different from a display mode of each of the other panels. According to such a configuration of the video game processing apparatus, it becomes possible to grasp the number of panels that can be continuously selected and a position of each of the panels at first glance. For this reason, it becomes possible to provide a video game processing apparatus that allows the video game to carry out progress of the video game by means of intuitive operations.

In this regard, the configuration of the video game processing system 100 is not limited to the configuration described above. For example, the video game processing apparatus may be configured so that the video game processing server 30 carries out part or all of the processes that have been explained as the processes carried out by the user terminals 11 to 1N. Further, the video game processing apparatus may be configured so that any of the plurality of user terminals 11 to 1N (for example, the user terminal 11) carries out part or all of the processes that have been explained as the processes carried out by the video game processing server 30 (in addition, including a configuration in which the plurality of user terminals 11 to 1N is not connected to the video game processing server 30). Further, the video game processing apparatus may be configured so that the user terminals 11 to 1N includes a part or all of the storage sections included in the video game processing server 30. Namely, the video game processing apparatus may be configured so that one of the user terminal 11 and the video game processing server 30 in the video game processing system 100 includes a part or all of the functions included in the other.

INDUSTRIAL APPLICABILITY

The present invention is useful for a puzzle game in which a user is caused to select an object.

DESCRIPTION OF REFERENCE NUMERALS

11 to 1N user terminal
20 control section
21 communication section
22 video game information storage section
22a game program storage section
22b character information storage section
22c panel information storage section
30 video game processing server
40 communication network
100 video game processing system

The invention claimed is:

1. A video game processing apparatus for controlling progress of a video game by causing a display device to display an object, the video game processing apparatus comprising:
a processor; and
a memory including a set of instructions that, when executed by the processor, causes the processor to perform operations including:
selectably displaying a plurality of panels within a predetermined area on a display screen of the display device, the plurality of panels being arranged in a predetermined array;
receiving, from a user, a selecting operation against any one of the plurality of panels displayed on the display screen;
specifying, via the selecting operation, additional ones of the plurality of panels which are continuously selected after the one of the plurality of panels is selected, the one of the plurality of panels and the additional ones of the plurality of panels being continuously selected panels of the plurality of panels, the continuously selected panels being continuously selected in accordance with the selecting operation; and
changing, after each of the continuously selected panels is selected via the selecting operation, a display mode of each of the plurality of panels which is configured to be continuously and directly selected next via the selecting operation so as to become a second display mode other than a first display mode of each of other panels of the plurality of panels which is not configured to be continuously and directly selected next via the selecting operation, the plurality of panels which is configured to be continuously and directly selected next via the selecting operation being continuously selectable panels,
wherein, when a number of the continuously selected panels is not at least a predetermined number, the continuously selected panels are cancelled, and
when the number of the continuously selected panels is at least the predetermined number, a value to advance the video game is determined according to the number of the continuously selected panels, wherein the value to advance the video game corresponds to at least one of an attack character and a damage amount.

2. The video game processing apparatus according to claim 1,
wherein the processor specifies panels neighboring the continuously selected panels as the continuously selectable panels.

3. The video game processing apparatus according to claim 1,
wherein the memory is configured to store panel information, the panel information containing attribute information that indicates an attribute of a panel, and
the processor specifies the continuously selectable panels on a basis of an attribute of the continuously selected panels and a predetermined rule.

4. The video game processing apparatus according to claim 1,
wherein the processor changes a size of each of the continuously selectable panels so as to become larger compared with a size of the other panels.

5. The video game processing apparatus according to claim 1,
wherein the processor changes the first display mode of each of the other panels.

6. The video game processing apparatus according to claim 1,
wherein the display device has a touch panel function, and the selecting operation includes a drag operation from the user.

7. The video game processing apparatus according to claim 1,
wherein the processor changes the first display mode of all of the continuously selectable panels that are configured to be continuously selected from the one of the plurality of panels as a starting point.

8. The video game processing apparatus according to claim 7, wherein the processor changes the first display mode of all of the continuously selectable panels to the second display mode.

9. The video game processing apparatus according to claim 1,
wherein, when the selecting operation is not continued and the number of the continuously selected panels is at least the predetermined number, the continuously selected panels are deleted from the display screen.

10. The video game processing apparatus according to claim 9,
wherein, when the continuously selected panels are deleted from the display screen, the processor replenishes the continuously selected panels on the display screen.

11. The video game processing apparatus according to claim 10,
wherein, when the continuously selected panels are deleted from the display screen, the processor carries out a panel replenishing lottery to determine panels to replenish the continuously selected panels on the display screen.

12. A non-transitory computer-readable medium including a video game processing program product configured to control a video game processing apparatus, the video game processing apparatus controlling progress of a video game by displaying an object on a display screen of a display device, the video game processing program product causing the video game processing apparatus to execute:

selectably displaying a plurality of panels within a predetermined area on the display screen of the display device, the plurality of panels being arranged in a predetermined array;

receiving, from a user, a selecting operation against any one of the plurality of panels displayed on the display screen;

specifying, via the selecting operation, additional ones of the plurality of panels which are continuously selected after the one of the plurality of panels is selected, the one of the plurality of panels and the additional ones of the plurality of panels being continuously selected panels of the plurality of panels, the continuously selected panels being continuously selected in accordance with the selecting operation; and changing, after each of the continuously selected panels is selected via the selecting operation, a display mode of each of the plurality of panels which is configured to be continuously and directly selected next via the selecting operation so as to become a second display mode other than a first display mode of the other panels of the plurality of panels which is not configured to be continuously and directly selected next via the selecting operation, the plurality of panels which is configured to be continuously and directly selected next via the selecting operation being continuously selectable panels, wherein, when a number of the continuously selected panels is not at least a predetermined number, the continuously selected panels are cancelled, and when the number of the continuously selected panels is at least the predetermined number, a value to advance the video game is determined according to the number of the continuously selected panels, wherein the value to advance the video game corresponds to at least one of an attack character and a damage amount.

* * * * *